US011601875B2

(12) United States Patent
Badic et al.

(10) Patent No.: US 11,601,875 B2
(45) Date of Patent: Mar. 7, 2023

(54) MULTIPLE RADIO ACCESS TECHNOLOGY APPLICATION MANAGEMENT

(71) Applicant: Intel IP Corporation, Santa Clara, CA (US)

(72) Inventors: Biljana Badic, Munich (DE); Markus Dominik Mueck, Unterhaching (DE); Zhibin Yu, Unterhaching (DE); Bernhard Raaf, Neuried (DE); Dave Cavalcanti, Portland, OR (US); Ana Lucia A. Pinheiro, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 366 days.

(21) Appl. No.: 16/485,674

(22) PCT Filed: Mar. 31, 2017

(86) PCT No.: PCT/US2017/025455
§ 371 (c)(1),
(2) Date: Aug. 13, 2019

(87) PCT Pub. No.: WO2018/182702
PCT Pub. Date: Oct. 4, 2018

(65) Prior Publication Data
US 2021/0321324 A1    Oct. 14, 2021

(51) Int. Cl.
*H04W 48/18*     (2009.01)
*H04W 4/80*      (2018.01)
*H04W 4/40*      (2018.01)
*H04L 1/20*      (2006.01)
*H04W 24/10*     (2009.01)
*H04W 80/02*     (2009.01)

(52) U.S. Cl.
CPC ............. *H04W 48/18* (2013.01); *H04L 1/203* (2013.01); *H04W 4/40* (2018.02); *H04W 4/80* (2018.02); *H04W 24/10* (2013.01); *H04W 80/02* (2013.01)

(58) Field of Classification Search
CPC ............................... H04L 29/06; H04W 4/40
USPC .......... 718/100, 104; 455/452.1, 552.1, 418; 370/329
See application file for complete search history.

(56) References Cited

U.S. PATENT DOCUMENTS

2013/0067484 A1*  3/2013  Sonoda ................. G06F 9/5038
                                              718/103
2013/0183992 A1   7/2013  Laroia et al.
(Continued)

OTHER PUBLICATIONS

PCT International Search Report issued for PCT/US17/25455, 1 pg., dated Jun. 27, 2017.

*Primary Examiner* — Kiet M Doan
(74) *Attorney, Agent, or Firm* — Banner & Witcoff Ltd.

(57) ABSTRACT

An application management apparatus for controlling tasks, including a task split and response merge circuit configured to divide an application into a plurality of tasks and associate respective Key Performance Indicator (KPI) attributes to the plurality of tasks; and a task management circuit configured to allocate each of the plurality of tasks to a first or second Radio Access Technology (RAT) based on the KPI attributes, and to derive a plurality of task responses from the first or second RATs to which the respective plurality of tasks are allocated, wherein the task split and response merge circuit is further configured to merge the task responses to select the first or second RAT to run the application.

23 Claims, 4 Drawing Sheets

(56) References Cited

U.S. PATENT DOCUMENTS

| | | |
|---|---|---|
| 2013/0258984 A1 | 10/2013 | Tofighbakhsh et al. |
| 2013/0272225 A1 | 10/2013 | De Pasquale et al. |
| 2013/0295986 A1* | 11/2013 | Mueck ................ H04W 48/18 455/552.1 |
| 2014/0313989 A1 | 10/2014 | Doken et al. |
| 2014/0355540 A1* | 12/2014 | Accongiagioco ........................... H04W 72/1231 370/329 |
| 2014/0357193 A1* | 12/2014 | Jose ................ H04W 88/06 455/41.2 |
| 2015/0201335 A1 | 7/2015 | De Pasquale et al. |
| 2016/0105530 A1* | 4/2016 | Shribman ............. H04L 67/06 709/218 |
| 2016/0173211 A1* | 6/2016 | Ouyang ................ H04B 17/16 455/425 |
| 2016/0212758 A1* | 7/2016 | Leung ................ G06Q 10/063 |
| 2016/0255559 A1 | 9/2016 | Droste et al. |
| 2016/0285935 A1* | 9/2016 | Wu .................... H04B 1/3822 |
| 2016/0295624 A1 | 10/2016 | Novlan et al. |
| 2017/0041916 A1* | 2/2017 | Soret ................ H04W 4/029 |
| 2017/0289886 A1* | 10/2017 | Shirahatti ............ H04W 36/30 |
| 2018/0192268 A1* | 7/2018 | Xu ...................... H04W 76/10 |
| 2021/0125490 A1* | 4/2021 | Yu ...................... G08G 1/0133 |

* cited by examiner

200
Road and Lane
Topology (RLT)
service

MULTIPLE RADIO ACCESS TECHNOLOGY APPLICATION MANAGEMENT

BACKGROUND

Vehicle-to-Everything (V2X) communication is the passing of information from a vehicle to any entity that may affect the vehicle, and vice versa. It is a vehicular communication system that incorporates other more specific types of communication, such as Vehicle-to-Vehicle (V2V), Vehicle-to-Infrastructure (V2I), Vehicle-to-Device (V2D), etc.

Currently there are two types of Radio Access Technologies (RATs) that support V2X communications: Dedicated Short Range Communications (DSRC) and cellular RATs. DSRC is a standard protocol for vehicular communication. Regarding cellular RATs, 3rd Generation Partnership Project (3GPP) Long Term Evolution (LTE) V2V/V2X is a candidate for 5th Generation (5G) RATs. DSRC and 3GPP LTE V2V/V2X differ substantially. For example, spectrum access is managed differently, that is, DSRC uses contention based access, whereas 3GPP LTE V2V/V2X manages scheduling based on efficient use of resources. V2X is used as an example type of communication for purposes of explanation, but the disclosure is not limited in this respect.

Early deployment of vehicle communication will likely be largely based on DSRC, but over time there will be a transition towards LTE V2V/V2X which is better integrated in 5G systems. While DSRC and LTE V2X are both deployed and available, and assuming that a wireless device supports both RATs, there is a question as to on which RAT an application should be run.

DESCRIPTION OF THE ASPECTS

The present disclosure is directed to an application management apparatus configured to select, based on gathered metrics, a Radio Access Technology (RAT) on which an application is best run.

Figure 1:
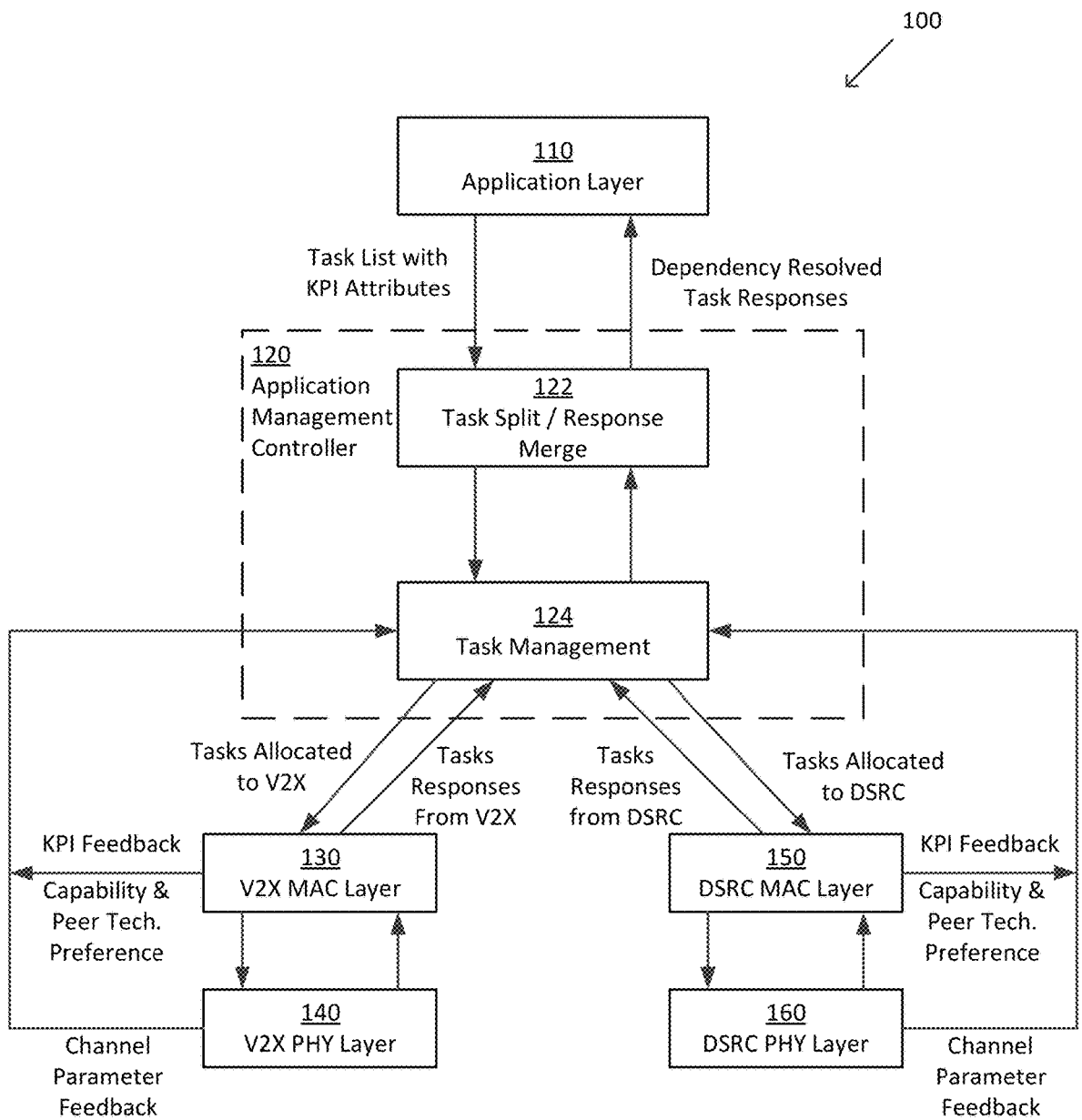
FIG. 1 is a schematic diagram illustrating an application management apparatus in accordance with aspects of the disclosure, along with portions of a wireless system.

FIG. 1 is a schematic diagram 100 illustrating an application management apparatus in accordance with aspects of the disclosure, along with portions of a wireless system.

The wireless system comprises an application layer 110, a V2X Medium Access Control (MAC) layer 130, a V2X physical layer 140, a DSRC MAC layer 150, and a DSRC physical layer 160. The application management apparatus 120, which is located within a wireless device operating within the wireless system, comprises a task split and response merge apparatus 122 and a task management apparatus 124. The wireless device may be a user equipment, Base Station (BS), Road Side Unit (RSU), or any other wireless device.

The application layer 110 generates a specific application to be run by the wireless device. This wireless device sends to the task split and response merge apparatus 122 within the application management apparatus 120, a request to execute the application, or to manage intra-RAT or inter-RAT handover of an active application. The term "handover" is used in the sense that both RATs (e.g., DSRC and V2X, though the disclosure is not limited to these RATs) are assumed to operate simultaneously, and the application is shifted from one RAT to another. In legacy "handover" cases, typically one RAT is shut down after the handover, which is not the case here.

The task split and response merge apparatus 122 is configured to divide the received application into tasks required to be performed by the application, and associate Key Performance Indicator (KPI) attributes to the tasks. For example, some tasks are less sensitive to latency, but require high throughput. Some tasks have a low throughput requirement, but are more sensitive to channel interference transmission errors. Some tasks are not sensitive to channel interference, but require highly predictable timing. Some tasks do not require highly predictable timing, but require a best average response time. Of course the disclosure is not limited to these particular KPI attributes; there may be other KPI attributes depending on the RATs involved.

Another attribute to consider is whether the task requires local communication in unicast or broadcast modes, or remote communication (i.e., access to RSU or BS in V2I). More specifically, attributes to consider may include V2V unicast-safety-critical versus non-safety-critical, V2V broadcast/group safety critical versus non-safety critical, V2I safety-critical versus non-safety critical, etc.

The task management apparatus 124 is configured to receive the associated KPI attributes from the task split and response merge apparatus 122. The task management apparatus 124 is configured to then allocate each of the tasks to a first RAT such as V2X or a second RAT such as DSRC. This allocation is performed using dynamic optimization algorithms based not only on the KPI attributes of each task, but also on communication link feedback from lower layers, that is, the MAC and physical layers 130, 140, 150, 160. For the purpose of illustrations, RATs such as DSRC and V2X, are described herein below. However, tasks of other RATs may also be managed by the task management apparatus 124 may be performed without departing the spirit and scope of the present disclosure.

The V2X MAC layer 130 and the DSRC MAC layer 150 may each provide the task management apparatus 124 with its KPI attribute feedback, such as downlink/uplink (DL/UL) throughput, Block Error Rate (BLER), retransmission rate measurements, etc. Also, the V2X physical layer 140 and the DSRC physical layer 160 may provide the task management apparatus 124 with channel parameter feedback, such as channel interference, available spectrum, propagation profiles, peer wireless devices, etc.

The task management apparatus 124 is also configured to derive task responses from the first or second RATs to which the respective tasks are allocated. More specifically, the tasks allocated to V2X RAT are forwarded to the V2X MAC layer 130, and then to the V2X physical layer 140, and tasks responses from the V2X physical layer 140 and the V2X MAC layer 130 are sent back to the task management apparatus 124. Similarly, the tasks allocated to DSRC RAT are forwarded to the DSRC MAC layer 150, and then to the DSRC physical layer 160, and tasks responses from the DSRC physical layer 160 and the DSRC MAC layer 150 are sent back to the task management apparatus 124. The task management apparatus 124 then resolves task dependencies. When dividing an application into different tasks, in practice, most tasks do not function independently; a task may require parameter inputs from another task in order to start, or need to wait for signaling from another task in order to complete. As the task dependencies are resolved, the task management apparatus 124 forwards the responses to the task split and response merge apparatus 122.

The task split and response merge apparatus 122 is then configured to combine the responses, conflicts free, to generate a general response to the application layer 110. The general response is an expected output from a task. A general response example could be control signaling (e.g., ACK/NACK confirmation) or data.

Communication between peer wireless devices requires that the wireless devices agree to communicate using a same RAT. If a wireless device independently switches to DSRC RAT while all other wireless devices are communicating using LTE RAT, the wireless devices will not be able to communicate. Therefore, the application management apparatus 120 may be configured to take into consideration capability and RAT preferences from peer wireless devices. These capability and RAT preferences are provided by the V2X MAC layer 130 and the DSRC MAC layer 150 to the task management apparatus 124. The application management apparatus 120 may therefore select an appropriate RAT such that the communication can happen between the wireless devices locally.

Voting or any other mechanisms may be used to select the RAT for communication. In case of platooning, a choice needs to be made between wireless devices of a communication group, that is, all of a plurality of wireless devices need to agree on a single RAT. Alternatively, more than one RAT can be used at the same time for the same message exchanges.

Further, there may be a common, RAT-agnostic, channel in which all wireless devices can advertise supported RATs and communicate channel quality. For example, a communication channel quality may be mapped to a number level, 1-5, wherein level 1 indicates that the communication channel is very bad (i.e., Received Signal Strength Indicator (RSSI) is less than a first predetermined threshold), and level 5 indicates that the channel is excellent (i.e., RSSI is greater than a second predetermined threshold), with other thresholds defined for levels 2, 3, and 4. For example, level 1=channel is very bad, level 2=channel is bad, level 3=channel is acceptable, level 4=channel is good, and level 5=channel is excellent.

Optionally, the common channel may be defined as a LTE channel for example, and all wireless devices can transmit in the common channel indicating a level of the channel condition for each of the RATs. This requires all wireless devices to be dual-mode wireless devices supporting both RATs. The information shared could be based on level indications. By way of example, for a first wireless device, LTE RAT=level 3, and DSRC RAT=level 4, which means that DRSC RAT is slightly preferred. For a second wireless device, LTE RAT=level 4, and DSRC RAT=level 2, which means that LTE RAT is preferred.

Optionally, a network may configure the parameters that the application management apparatus 120 uses for RAT decision making. The result would permit better matching between different wireless devices, so that a plurality of wireless devices would be more likely to choose the same RAT, and the negotiation needed between wireless devices before transmission would be minimized. For example, the LTE network could configure the wireless devices to measure received signal levels in specific channels, and based on the measurements network-configured thresholds, decide which RAT is appropriate. The can also be performed based on throughput measurements. Furthermore, the network may configure which channels a wireless device measures, how a particular wireless device knows which RAT is being used by other wireless devices, and how RAT decision negotiation is performed. For example, a network may assign one wireless device to be a "RAT selector" for a region. This wireless device receives information from the other wireless devices, and then make a RAT decision, also taking into consideration its own levels. Then the assigned wireless device broadcasts its decision in that same common channel to all interested wireless devices. A level 0 (zero) could be defined for the wireless device to indicate lack of support for the corresponding RAT. As wireless devices move around, the RAT selector wireless device may change.

Figure 2:
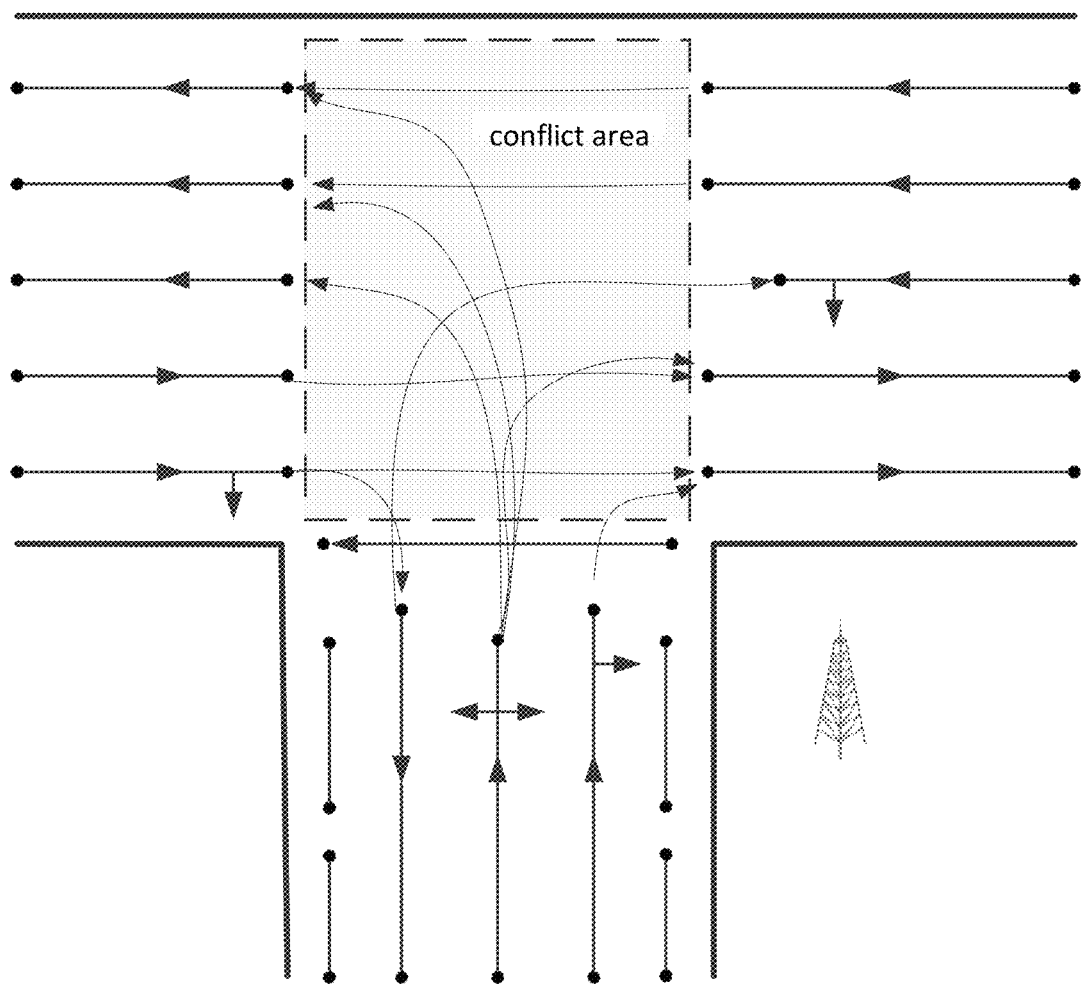
FIG. 2 is a topology illustrating an intersection with traffic streams.
Figure 3:
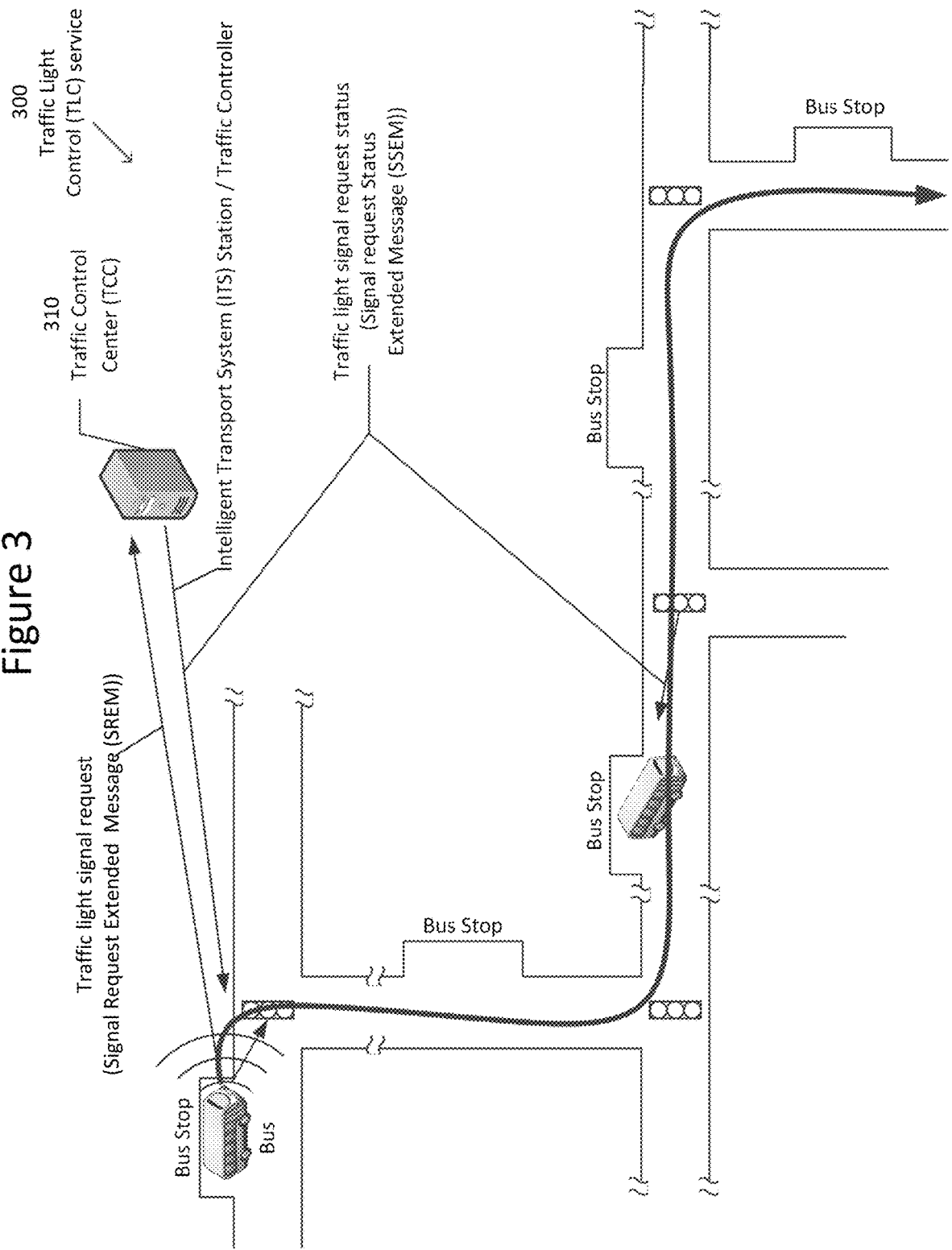
FIG. 3 is a topology illustrating a bus requesting traffic light signal priority for a defined bus route to a Traffic Control Centre (TCC).

FIG. 2 is a topology 200 illustrating an intersection 200 with traffic streams, and FIG. 3 is a topology 300 illustrating a bus requesting traffic light signal priority for a defined bus route to a Traffic Control Centre (TCC). These figures are based on figure in European Telecommunications Standards Institute (ETSI) Technical Specification (TS) 103 301: Intelligent Transport Systems (ITS); Vehicular Communications; Basic Set of Applications; Facilities layer protocols and communication requirements for infrastructure services, V1.1.1.

To illustrate the usefulness of this disclosure, it is assumed that a wireless device in a vehicle will simultaneously use two of the services defined in the ETSI specification. These services are Road and Lane Topology (RLT) services, and Traffic Light Control (TLC) service.

The RLT service, illustrated in FIG. 2, manages generation, transmission and reception of a digital topological map, which defines the topology of an infrastructure area. The RLT service includes lane topology (e.g. vehicles, bicycles, parking, public transportation and the paths for pedestrian crossings) and permitted maneuvers within an intersection or road segment.

The TLC service, illustrated in FIG. 3, manages generation and transmission of Signal Request Extended Messages (SREM) and Signal request Status Extended Messages (SSEM). The TLC service supports prioritization of public transport and public safety vehicles (e.g., ambulance, fire brigade, etc.) to traverse a signalized road infrastructure (e.g., intersection) as fast as possible or using a higher priority than ordinary vehicles. The corresponding SREM is sent by an Intelligent Transport Systems Station (ITS-S) (e.g., vehicle) to the traffic infrastructure environment (e.g., Roadside ITS Station (R-ITS-S), Traffic Control Center (TCC)). In a signalized environment (e.g., intersection) the SREM is sent to request traffic light signal priority (public transport) signal preemption (public safety). The service may not only be requested for the approaching signalized environment, but also for a sequence of, for example, intersections along a defined traffic route. In response to the request, the infrastructure (e.g., R-ITS-S/TLC or TCC) acknowledges with an SSEM to notify whether the request has been granted, canceled or changed in priority due to a more relevant signal request (e.g., ambulance).

As a first example applying the aspects illustrated in FIG. 1, it is assumed that the monetary cost of RLT service is lower for DSRC as compared to LTE, and vice versa for TLC. In this case, the application management apparatus 120 of a wireless device 400 in a vehicle selects DSRC RAT for the RLT service, and selects LTE RAT for the TLC service.

In situation where DSRC coverage is limited, DSRC RAT is provided by RSUs within or near traffic lights, as TLC is for traffic light control service. Since DSRC is now available at the traffic lights, the preferred RAT for TLC near these traffic light locations is DSRC. The RLT service is assumed to be further away from those traffic lights/RSUs, and in these further locations LTE is preferred.

As a second example applying the aspects illustrated in FIG. 1, it is assumed that signal quality of RLT service is higher for DSRC as compared to LTE, and vice versa for TLC. In this case, the application management apparatus 120 of a wireless device 400 in a vehicle selects DSRC RAT for the RLT service, and selects LTE RAT for the TLC service.

As a third example applying the aspects illustrated in FIG. 1, it is assumed that signal quality of the RLT service is low for both RATs, DSRC and LTE. The application management apparatus 120 of a wireless device 400 in a vehicle may therefore select both RATs, DSRC and LTE simultaneously, and merge the information together in order to achieve an improved overall reliability of the information. Also, both RATs may not transmit identical data, so a merge of the information provided by both RATs may lead to increased and more reliable insight to the RLT situation.

Figure 4:
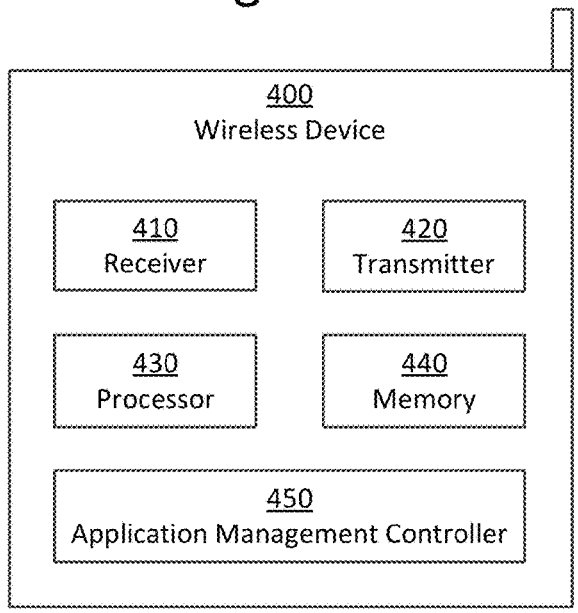
FIG. 4 is a schematic diagram illustrating a wireless device in accordance with aspects of the disclosure.

FIG. 4 is a schematic diagram illustrating a wireless device 400 in accordance with aspects of the disclosure. The wireless device 400 may be located in a vehicle, base station, or road side unit. The wireless device 400 may comprise a receiver 410, a transmitter 420, a processor 430, a memory 440, and an application management apparatus 450. As should be clear, the receiver 410, transmitter 420, processor 430, and memory 440 are configured to respectively receive, transmit, process, and store base station databases BSDBs. The application management apparatus 450 corresponds with the application management apparatus 120 of FIG. 1.

It is assumed that DSRC and LTE V2X links are provided by different radio frequency front-ends coupled to different antennas and with different inherent receiver sensitivities, though the disclosure is not limited in this respect. The signal quality received in vehicles may differ for DSRC and LTE V2X due to different multipath profiles, receiver sensitivities, shadowing (e.g., truck located between the vehicle and surrounding antennas), or simply that the distance to other wireless devices is too large for one RAT.

Figure 5:
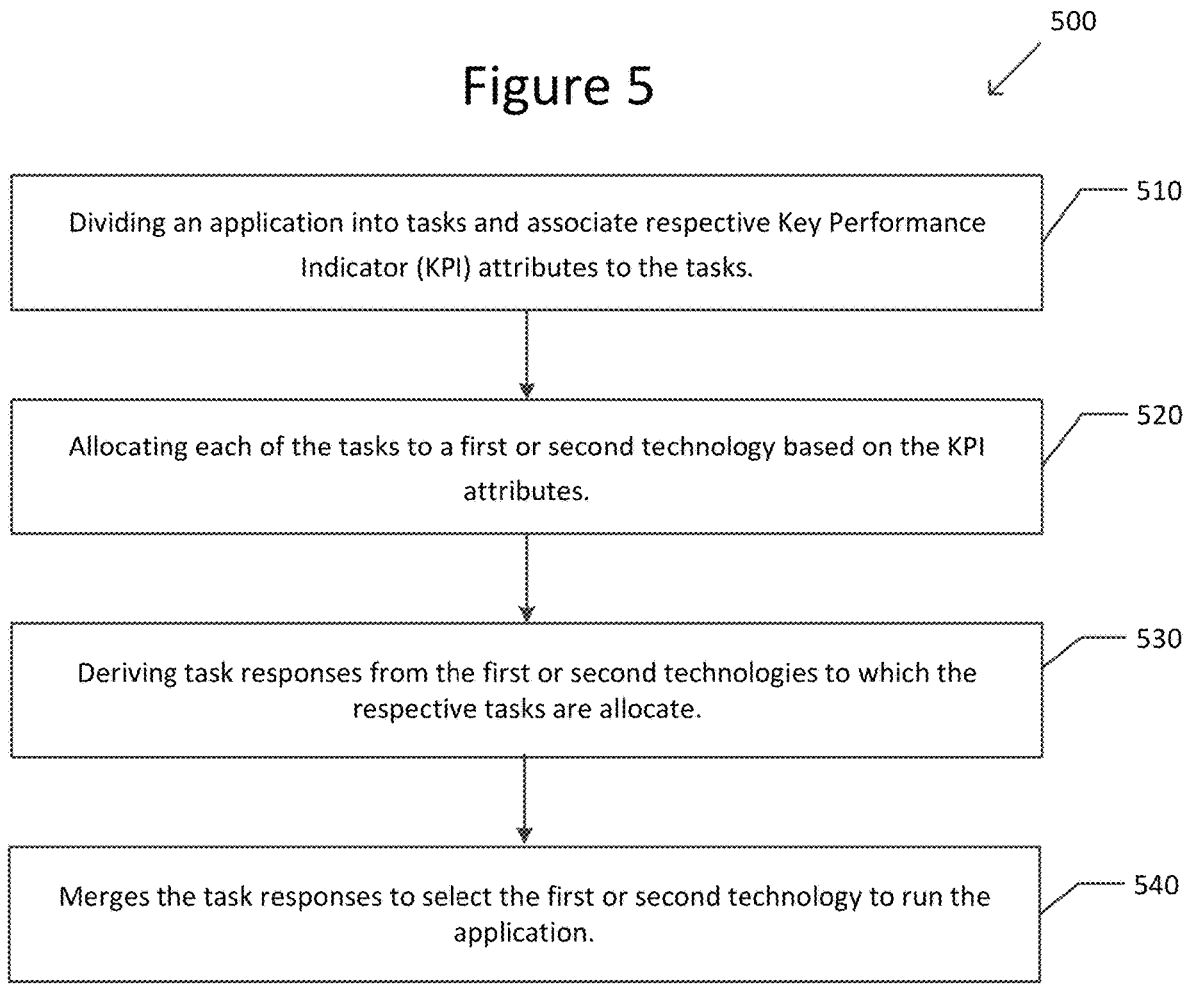
FIG. 5 is a flowchart illustrating a method for managing applications in accordance with aspects of the disclosure.

FIG. 5 is a flowchart 500 illustrating a method for managing applications in accordance with aspects of the disclosure. This method is performed by the application management apparatus 120 of FIG. 1.

In Step 510, the task split and response merge apparatus 122 divides an application into tasks and associate respective KPI attributes to the tasks.

In Step 520, the task management apparatus 124 allocates each of the tasks to a first or second RAT based on the KPI attributes. Optionally, additionally, the task management apparatus 124 may allocate each of the tasks to the first or second RAT based on KPI attribute feedback from the V2X MAC layer 130 and the DSRC MAC layer 150. Optionally, additionally, the task management apparatus 124 may allocate each of the tasks to the first or second RAT based on channel parameter feedback from the V2X physical layer 140 and the DSRC physical layer 160.

In Step 530, the task split and response merge apparatus 122 derives task responses from the first or second RAT that the respective tasks are allocated.

In Step 540, the task split and response merge apparatus 122 merges the task responses to select the first or second RAT to run the application.

DSRC and LTE V2V/V2X have been seen as orthogonal systems with no consideration to optimized allocation of the locally best suited system. The subject matter of this disclosure is advantageous in that it fully exploits the joint deployment of DSRC and LTE V2V/V2X systems.

While this disclosure is described with respect to V2X and DSRC RATs, it is understood that the disclosure is not limited to these particular RATs, or to only two RATs. Any of the radio links may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Worldwide Interoperability for Microwave Access (WiMAX)

Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-Everything (V2X) and Vehicle-to-Infrastructure (V2I), Infrastructure-to-Vehicle (I2V), Vehicle-to-Device (V2D) communication technologies, 3GPP cellular V2X, IEEE 802.11p based, DSRC (Dedicated Short Range Communications) communication systems such as Intelligent-Transport-Systems and others, etc.

The concepts can also be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc.). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Furthermore, a hierarchical application of the scheme is possible, for example, by introducing a hierarchical prioritization of usage for different types of wireless devices (e.g., low/medium/high priority, etc.), based on a prioritized access to the spectrum, for example, with highest priority to tier-1 wireless devices, followed by tier-2, then tier-3, etc. wireless devices, etc.

The concepts can also be applied to different Single Carrier or OFDM varieties, such as CP-OFDM, SC-FDMA, SC-OFDM, filter bank-based multicarrier (FBMC), OFDMA, etc., and in particular 3GPP NR (New Radio) by allocating the OFDM carrier data bit vectors to the corresponding symbol resources.

The concepts described herein may also be applicable in enterprise settings, industrial settings (e.g., robot-to-robot), aviation (e.g., plane-to-plane, drone-to-drone) and to RATs having both contention and non-contention based protocols, such as 5G and Wi-Fi.

For the purposes of this discussion, the "application management apparatus", "task split and response merge means" and/or "task management means" shall be understood to be circuit(s), processor(s), logic, or a combination thereof. These elements can include a microprocessor, a digital signal processor (DSP), or other hardware processor. The processor/processing means can be "hard-coded" with instructions to perform corresponding function(s) according to aspects described herein. Alternatively, these elements can access an internal and/or external memory to retrieve instructions stored in the memory, which when executed by the elements, perform the corresponding function(s) associated with the elements, and/or one or more functions and/or operations related to the operation of a component having the elements included therein.

The following examples pertain to further embodiments.

Example 1 is an application management apparatus for controlling tasks, comprising: a task split and response merge circuit configured to divide an application into a plurality of tasks and associate respective Key Performance Indicator (KPI) attributes to the plurality of tasks; and a task management circuit configured to allocate each of the plurality of tasks to a first or second Radio Access Technology (RAT) based on the KPI attributes, and to derive a plurality of task responses from the first or second RATs to which the respective plurality of tasks are allocated, wherein the task split and response merge circuit is further configured to merge the task responses to select the first or second RAT to run the application.

In Example 2, the subject matter of Example 1, wherein the task management circuit is configured to allocate each of the plurality of tasks to the first or second RAT based on KPI attribute feedback from Medium Access Control (MAC) layers of the first and second RATs.

In Example 3, the subject matter of Example 2, wherein the KPI attribute feedback of the MAC layers comprises measurements of downlink/uplink (DL/UL) throughput, Block Error Rate (BLER), or retransmission rate measurements.

In Example 4, the subject matter of Example 1, wherein the task management circuit is configured to allocate each of the tasks to the first or second RAT based on channel parameter feedback from physical layers of the first and second RATs.

In Example 5, the subject matter of Example 4, wherein the channel parameter feedback comprises measurements of channel interference, available free spectrum, or propagation profile.

In Example 6, the subject matter of Example 1, wherein the first and second RATs comprise Vehicle-to-Everything (V2X) communication and Dedicated Short Range Communications (DSRC), respectively.

In Example 7, the subject matter of Example 6, wherein the V2X communication is Long Term Evolution (LTE) V2X communication.

In Example 8, the subject matter of Example 1, wherein the task split and response merge circuit is configured to select both of the first and second RATs.

Example 9 is a wireless device, comprising: the subject matter of Example 1.

In Example 10, the subject matter of Example 9, wherein the task split and response merge circuit is configured to select the first or second RAT based on a RAT preference of a peer wireless device.

In Example 11, the subject matter of Example 9, wherein the application management apparatus is configured to receive a request from the wireless device to execute the application.

In Example 12, the subject matter of Example 9, wherein the application management apparatus is configured to receive a request from the wireless device to manage an intra-RAT or inter-RAT handover of the application.

In Example 13, the subject matter of Example 9, wherein application management apparatus is configured to select, for a plurality of peer wireless devices in a region, the first or second RAT.

In Example 14, the subject matter of Example 13, further comprising: a transmitter configured to transmit to the peer wireless devices the selected first or second RAT.

In Example 15, the subject matter of Example 9, wherein the wireless device is configured to communicate with peer wireless devices over a common channel.

In Example 16, the subject matter of Example 9, wherein the wireless device is a base station, a Road Side Unit (RSU) or a User Equipment (UE).

Example 17 is a method for managing applications, comprising: dividing, by a task split and response merge circuit an application into a plurality of tasks and associate respective Key Performance Indicator (KPI) attributes to the plurality of tasks; allocating, by a task management circuit, each of the plurality of tasks to a first or second Radio Access Technology (RAT) based on the KPI attributes; deriving, by the task management circuit, s plurality of task responses from the first or second RATs to which the respective plurality of tasks are allocated; and merging, by the task split and response merge circuit, the plurality of task responses to select the first or second RAT to run the application.

In Example 18, the subject matter of Example 17, wherein the allocating comprises allocating each of the plurality of tasks to the first or second RAT based on KPI attribute feedback from Medium Access Control (MAC) layers of the first and second RATs.

In Example 19, the subject matter of Example 18, wherein the KPI attribute feedback of the MAC layers comprises measurements of downlink/uplink (DL/UL) throughput, Block Error Rate (BLER), or retransmission rate measurements.

In Example 20, the subject matter of Example 17, wherein the allocating comprises allocating each of the tasks to the first or second RAT based on channel parameter feedback from physical layers of the first and second RATs.

In Example 21, the subject matter of Example 20, wherein the physical layer channel parameter feedback comprises measurements of channel interference, available free spectrum, or propagation profile.

In Example 22, the subject matter of Example 17, wherein the first and second RATs comprise Vehicle-to-Everything (V2X) communication and Dedicated Short Range Communications (DSRC), respectively.

In Example 23, the subject matter of Example 17, further comprising: selecting, by the task split and response merge circuit, both of the first and second RATs.

In Example 24, the subject matter of Example 17, further comprising: selecting, by the task split and response merge circuit, the first or second RAT based on a RAT preference of a peer device.

In Example 25, the subject matter of Example 17, further comprising: selecting, for a plurality of peer devices in a region, the first or second RAT.

Example 26 is an application management apparatus for controlling tasks, comprising: a task split and response merge means for diving an application into a plurality of tasks and associate respective Key Performance Indicator (KPI) attributes to the plurality of tasks; and a task management means for allocating each of the plurality of tasks to a first or second Radio Access Technology (RAT) based on the KPI attributes, and to derive a plurality of task responses from the first or second RATs to which the respective plurality of tasks are allocated, wherein the task split and response merge means is for merging the plurality of task responses to select the first or second RAT to run the application.

In Example 27, the subject matter of Example 26, wherein the task management means is for allocating each of the plurality of tasks to the first or second RAT based on KPI attribute feedback from Medium Access Control (MAC) layers of the first and second RATs.

In Example 28, the subject matter of Example 27, wherein the KPI attribute feedback of the MAC layers comprises measurements of downlink/uplink (DL/UL) throughput, Block Error Rate (BLER), or retransmission rate measurements.

In Example 29, the subject matter of any of Examples 26-28, wherein the task management means is for allocating each of the tasks to the first or second RAT based on channel parameter feedback from physical layers of the first and second RATs.

In Example 30, the subject matter of Example 29, wherein the channel parameter feedback comprises measurements of channel interference, available free spectrum, or propagation profile In Example 31, the subject matter of Example 26, wherein the first and second RATs comprise Vehicle-to-Everything (V2X) communication and Dedicated Short Range Communications (DSRC), respectively.

In Example 32, the subject matter of Example 31, wherein the V2X communication is Long Term Evolution (LTE) V2X communication.

In Example 33, the subject matter of Example 26, wherein the task split and response merge means is for selecting both of the first and second RATs.

Example 34 is a wireless device, comprising: the subject matter of Example 26.

In Example 35, the subject matter of Example 34, wherein the task split and response merge means is for selecting the first or second RAT based on a RAT preference of a peer wireless device.

In Example 36, the subject matter of Example 34, wherein the wireless device is a user equipment.

In Example 37, the subject matter of Example 34, wherein the application management apparatus is configured to receive a request from the wireless device to execute the application.

In Example 38, the subject matter of Example 34, wherein the application management apparatus is configured to receive a request from the wireless device to manage an intra-RAT or inter-RAT handover of the application.

In Example 39, the subject matter of Example 34, wherein application management apparatus is configured to select, for a plurality of peer wireless devices in a region, the first or second RAT.

In Example 40, the subject matter of Example 39, further comprising: a transmitting means for transmitting to the peer wireless devices the selected first or second RAT.

In Example 41, the subject matter of Example 34, wherein the wireless device is configured to communicate with peer wireless devices over a common channel.

In Example 42, the subject matter of Example 34, wherein the wireless device is a base station, a Road Side Unit (RSU) or a User Equipment (UE).

While the foregoing has been described in conjunction with exemplary aspect, it is understood that the term "exemplary" is merely meant as an example, rather than the best or optimal. Accordingly, the disclosure is intended to cover alternatives, modifications and equivalents, which may be included within the scope of the disclosure.

Although specific aspects have been illustrated and described herein, it will be appreciated by those of ordinary skill in the art that a variety of alternate and/or equivalent implementations may be substituted for the specific aspects shown and described without departing from the scope of the present application. This application is intended to cover any adaptations or variations of the specific aspects discussed herein.

The invention claimed is:

1. An application management apparatus for controlling tasks, comprising:
   a task split and response merge circuit configured to divide an application into a plurality of tasks and associate respective Key Performance Indicator (KPI) attributes to the plurality of tasks; and
   a task management circuit configured to allocate each of the plurality of tasks of the application to a first or second Radio Access Technology (RAT) based on the KPI attributes, and to derive a plurality of task responses from the first or second RAT to which the respective plurality of tasks are allocated,
   wherein the task split and response merge circuit is further configured to merge the task responses and select, based on the KPI attributes, the first and second RATs simultaneously.

2. The application management apparatus of claim 1, wherein the task management circuit is configured to allocate each of the plurality of tasks to the first or second RAT based on KPI attribute feedback from Medium Access Control (MAC) layers of the first and second RATs.

3. The application management apparatus of claim 2, wherein the KPI attribute feedback of the MAC layers comprises measurements of downlink/uplink (DL/UL) throughput, Block Error Rate (BLER), or retransmission rate measurements.

4. The application management apparatus of claim 1, wherein the task management circuit is configured to allocate each of the tasks to the first or second RAT based on channel parameter feedback from physical layers of the first and second RATs.

5. The application management apparatus of claim 4, wherein the channel parameter feedback comprises measurements of channel interference, available free spectrum, or propagation profile.

6. The application management apparatus of claim 1, wherein the first and second RATs comprise Vehicle-to-Everything (V2X) communication and Dedicated Short Range Communications (DSRC), respectively.

7. The application management apparatus of claim 6, wherein the V2X communication is Long Term Evolution (LTE) V2X communication.

8. A wireless device, comprising:
   the application management apparatus of claim 1.

9. The wireless device of claim 8, wherein the task split and response merge circuit is configured to select the first or second RAT based on a RAT preference of a peer wireless device.

10. The wireless device of claim 8, wherein the application management apparatus is configured to receive a request from the wireless device to execute the application.

11. The wireless device of claim 8, wherein the application management apparatus is configured to receive a request from the wireless device to manage an intra-RAT or inter-RAT handover of the application.

12. The wireless device of claim 8, wherein application management apparatus is configured to select, for a plurality of peer wireless devices in a region, the first or second RAT.

13. The wireless device of claim 12, further comprising:
   a transmitter configured to transmit to the peer wireless devices the selected first or second RAT.

14. The wireless device of claim 8, wherein the wireless device is configured to communicate with peer wireless devices over a common channel.

15. The wireless device of claim 8, wherein the wireless device is a base station a Road Side Unit (RSU) or a User Equipment (UE).

16. A method for managing applications, comprising:
   dividing, by a task split and response merge circuit an application into a plurality of tasks and associate respective Key Performance Indicator (KPI) attributes to the plurality of tasks;
   allocating, by a task management circuit, each of the plurality of tasks of the application to a first or second Radio Access Technology (RAT) based on the KPI attributes;
   deriving, by the task management circuit, a plurality of task responses from the first or second RATs to which the respective plurality of tasks are allocated; and
   merging, by the task split and response merge circuit, the plurality of task responses and select, based on the KPI attributes, the first and second RATs simultaneously.

17. The method of claim 16, wherein the allocating comprises allocating each of the plurality of tasks to the first or second RAT based on KPI attribute feedback from Medium Access Control (MAC) layers of the first and second RATs.

18. The method of claim 17, wherein the KPI attribute feedback of the MAC layers comprises measurements of downlink/uplink (DL/UL) throughput, Block Error Rate (BLER), or retransmission rate measurements.

19. The method of claim 16, wherein the allocating comprises allocating each of the tasks to the first or second RAT based on channel parameter feedback from physical layers of the first and second RATs.

20. The method of claim 19, wherein the physical layer channel parameter feedback comprises measurements of channel interference, available free spectrum, or propagation profile.

21. The method of claim 16, wherein the first and second RATs comprise Vehicle-to-Everything (V2X) communication and Dedicated Short Range Communications (DSRC), respectively.

22. The method of claim 16, further comprising:
   selecting, by the task split and response merge circuit, the first or second RAT based on a RAT preference of a peer device.

23. The method of claim 16, further comprising:
selecting, for a plurality of peer devices in a region, the first or second RAT.

\* \* \* \* \*